United States Patent [19]

Mandralis et al.

[11] Patent Number: 5,523,110
[45] Date of Patent: Jun. 4, 1996

[54] CHOCOLATE HEAT-RESISTANCE BY PARTICULATE POLYOL GEL ADDITION

[75] Inventors: Zenon I. Mandralis, Dublin; Don P. Weitzenecker, Urbana Pike, both of Ohio

[73] Assignee: Nestec S.A, Vevey, Switzerland

[21] Appl. No.: 264,780

[22] Filed: Jun. 23, 1994

[51] Int. Cl.⁶ ............................................. A23G 1/00
[52] U.S. Cl. .............................. 426/660; 426/548
[58] Field of Search ........................ 426/548, 660

[56] References Cited

U.S. PATENT DOCUMENTS

| | | | |
|---|---|---|---|
| 4,105,801 | 8/1978 | Dogliotti | 426/660 |
| 4,134,999 | 1/1979 | Muhler | 426/660 |
| 4,466,983 | 8/1984 | Cefrese | 426/660 |
| 4,980,189 | 12/1990 | Keme | 426/660 |
| 4,980,192 | 12/1990 | Finkel | 426/660 |
| 5,017,400 | 5/1991 | Olinger | 426/660 |
| 5,063,080 | 11/1991 | Kruger | 426/660 |
| 5,108,769 | 4/1992 | Kines | 426/660 |
| 5,139,795 | 8/1992 | DuRoss | 426/660 |
| 5,223,303 | 6/1993 | Taskinen | 426/660 |
| 5,244,690 | 9/1993 | Van der Schueren | 426/660 |

FOREIGN PATENT DOCUMENTS

| | | |
|---|---|---|
| 0455886A1 | 11/1991 | European Pat. Off. . |
| 045977A1 | 12/1991 | European Pat. Off. . |
| WO8600787 | 2/1986 | WIPO . |

*Primary Examiner*—Carolyn Paden
*Attorney, Agent, or Firm*—Vogt & O'Donnell

[57] ABSTRACT

Chocolate-based confectionery products having improved heat-resistance are prepared by mixing a polyol gel in particulate form with a flowable chocolate or a flowable mixture of ingredients for preparing a chocolate or chocolate-type composition in an amount to obtain a product having, based upon the product weight, a polyol content of from 0.2% to 60% by weight.

27 Claims, No Drawings

CHOCOLATE HEAT-RESISTANCE BY PARTICULATE POLYOL GEL ADDITION

BACKGROUND OF THE INVENTION

The present invention relates to improving the heat resistance of chocolate or chocolate-type products so that they have a reduced tendency to deform or melt at elevated temperatures or to stick to the packaging material.

Chocolate products are usually thorough mixtures of liquid cocoa, cocoa butter, sugar, lecithin and possibly milk and flavouring substances. They therefore contain fatty substances which soften and melt between 30° and 35° C.

When articles which consist entirely or partly of these products are exposed to temperatures lying above the melting point of the aforesaid fatty substances, (i.e., temperatures occurring during the summer season or in tropical countries), they tend to lose their original shape and appearance, and become soft and unpleasant to handle. If they are wrapped, the surface of the article may adhere to the wrapper and may produce unsightly fat staining.

In the case of chocolate-type coatings intended to enrobe articles such as biscuits, confectionery, etc., the articles immediately lose their original appearance and are no longer suitable for consumption when they have been exposed to high temperature.

Different processes have been proposed in order to avoid the foregoing disadvantages, but the products obtained, although more resistant to the effects of high temperature, have an unpleasant taste and a perceptibly coarser texture than that of normal conched chocolate.

In European Patent Application Publication No. 0 189 469, there is claimed a method of increasing the viscosity of a chocolate composition containing cocoa butter so that said composition will be substantially non-flowable at a temperature well above the normal melting point of cocoa butter characterised in that it comprises mixing 0.2 to 5 wt % of a liquid polyol, which is selected from the group comprising glycerine, sorbitol, propylene glycol, mannitol, corn syrup and combinations and solutions thereof, with a chocolate mixture after it has been tempered. However, a disadvantage of this process is that the chocolate tends to set rapidly, e.g., from 40 to 60 seconds, and this allows very little time for the further processing of the chocolate, e.g., moulding into tablets of the desired shape or depositing a coating. A disadvantage of this method is that special additional equipment would be needed to incorporate the polyol at the latest possible time before further processing of the chocolate to prevent premature setting of the chocolate.

European Patent Application Publication No. 0 459 777 describes and claims a structured fat emulsion for incorporation into a confectionery coating as the fat ingredient thereof wherein:

a blend of a polyol component together with a fat component, said blend being a polyol-in-fat emulsion in which between about 2 and about 20 weight percent, based on the total weight of polyol-in-fat emulsion, said polyol component is emulsified within said fat component, whereby said structured fat emulsion effects a time-delay in the development of enhanced heat resistance and retardation of bloom development in a confectionery coating formulation when the formulation is subjected to setting conditions to form a set confectionery coating, and whereby these properties are substantially latent until the confectionery coating formulation is subjected to the setting conditions, at least to the extent that the confectionery coating is flowable until subjected to the setting conditions. In the '777 Application, the polyol is blended separately with the fat ingredient of a confectionery coating before being added to the remaining ingredients of the confectionery coating so that the confectionery coating remains flowable until subjected to setting conditions. The confectionery coating may be a chocolate coating whereby the fat ingredient, with which the polyol is blended, may be, for instance, cocoa butter or a partially hydrogenated soybean fat. However, a disadvantage of a process of producing a confectionery coating containing a structured fat emulsion claimed in the '777 Application is that it cannot be used in the normal chocolate manufacturing process because the polyol has to be blended separately with the fat ingredient of the chocolate before adding to the remaining ingredients.

SUMMARY OF THE INVENTION

We have now found, surprisingly, that if a polyol gel or a polyol/water gel is added in particulate form to a flowable chocolate or flowable mixture of chocolate ingredients containing substantially the normal fat content for a conventional chocolate or chocolate coating, the resultant chocolate product not only has improved heat resistance but the setting rate is similar to normal chocolate, i.e., very much slower than when using the method of the above-noted '469 Application. This is because the polyol diffuses out of the gel gradually. In addition, this product can be used in the normal chocolate manufacturing process, unlike the structured fat emulsion described in the above-noted '777 Application.

Hereinafter, the term "polyol gel" should be understood to mean either a polyol gel or a polyol/water gel.

Accordingly, the present invention provides a process for improving the heat resistance of chocolate or chocolate-type products so that they have a reduced tendency to deform at elevated temperatures which comprises mixing a polyol gel product in particulate form with a flowable chocolate or a flowable mixture of ingredients for preparing chocolate and chocolate-type compositions in an amount to achieve a polyol content of from 0.2 to 60% by weight based on the total amount of the resultant product.

The flowable chocolate or mixture of ingredients may be or consist of the ingredients used for conventional plain, milk, or white chocolate, substitute or imitation chocolate or low-calorie chocolate to be used for chocolate bars or for coatings.

DETAILED DESCRIPTION OF THE INVENTION

In carrying out the process of the present invention, the polyol gel may be formed by gelation of a polyol or a polyol/water mixture with a gelling agent. Examples of suitable gelling agents are gelatin, agarose, pectin, xanthan gum, locust bean gum, agar, kappa-carrageenan, sodium alginate and iota-carrageenan. Other suitable gelling agents such as polysaccharides, e.g., glucomannan, may readily be selected by those skilled in the art. The gelling agents may be used individually or in any combination, provided a suitably firm gel is formed with the polyol.

The polyol which is used for gelation is preferably a liquid and may be a straight or branched chain hydrocarbon-based compound containing at least two hydroxyl groups on the carbon skeleton. For example, the polyol may be a dihydric alcohol, a trihydric alcohol such as glycerol, mannitol, sorbitol, propylene glycol or corn syrup or any combination thereof.

The polyol which is used for gelation may be a dry polyol containing no or substantially no water, for instance, less than 2%. The polyol/water mixture which is gelled may be a mixture containing up to 95% by weight of water, for example, from 5 to 85% and if desired, from 10 to 50% by weight of water. When mixtures of polyol and water are used, the resulting chocolate may be less costly and have a lower calorie content than normal chocolate because a substantial portion of the chocolate's fat and sugar may be replaced by water and polyol. It may also be possible to incorporate water- and/or polyol-soluble aromas or flavours into chocolate.

We have found that the setting time or "hardening" time of the chocolate is increased when less water is used.

Hereinafter, the term "polyol" should be understood to mean either a dry polyol or a polyol/water mixture.

The gelation of the polyol may be carried out by a variety of gelation techniques depending on the gelling agent used. For example, ionic gelation is preferred when sodium alginate is the gelling agent. Thermal gelation is preferred in some cases, because it does not require the addition of substances other than the gelling agent.

Thermal gelation may be carried out, for instance, by slowly adding the gelling agent to the polyol with agitation below the gelling temperature to form a dispersion, raising the temperature to above the dissolution temperature, e.g., 90°–170° C., while maintaining the agitation and then cooling to below the gelling temperature, e.g., ambient temperature. Gelling occurs between 80° and 50° C. The amount of gelling agent used to form the gel may be from 0.5 to 15%, preferably from 1 to 7%, and especially from 1.5 to 5%, by weight based on the weight of the polyol.

If desired, a gum such as locust bean gum or gum arabic may be incorporated in the polyol gel product, which may decrease syneresis and increase the break-strength and resilience of the gel. Advantageously, the gum may be dispersed in the cold solution of the gelling agent in the polyol before gelation. The amount of gum may be up to 10%, preferably from 0.5 to 5%, and especially from 1 to 3%, by weight based on the weight of the polyol. The gum may conveniently be incorporated by dispersing it in the cold dry polyol, increasing the temperature to dissolve the gum, e.g., from 100° to 130° C., and cooling back to room temperature, after which the gelling agent may be added to form the gel, e.g. according to the procedure described above. Other suitable gums will be readily determined by those skilled in the art.

Advantageously, certain food-grade alkali metal or alkaline earth metal salts, casein or cocoa powder may be added to the solution of the gelling agent in the polyol before gelation to alter the characteristics of the resultant gel. The alkali metal or alkaline earth metal salt may be, for instance, a sodium or calcium salt, but is preferably a potassium salt e.g. KCl. The amount of alkali metal or alkaline earth metal salt added is preferably less than 1% by weight based on the weight of the polyol, since amounts substantially greater than 1% may prevent gelation. The amount of casein, e.g., as a potassium salt, or cocoa powder may vary more widely, e.g., up to 20%, and from 3 to 15%, by weight based on the weight of polyol according to choice. The addition of one or more of the above ingredients may contribute to the overall strength of the gel, and this is particularly advantageous when the amount of gelling agent is low, e.g., from 0.5 to 1.5% by weight. Low amounts of gelling agent may be used if short "hardening" or "setting" times are required for the chocolate.

The polyol gel should preferably disperse uniformly into the chocolate mass and this is achieved by forming the gel into particles, especially beads.

One method of forming a particulated polyol gel involves freezing the prepared polyol gel, e.g., to a temperature of from about −170° C. to −200° C., and then grinding in a cold grinder. The mean diameter of the particles or beads may be from 1 to 1000 microns, preferably from 5 to 400 microns and especially from 10 to 100 microns. Advantageously, an anti-caking agent such as cocoa powder may be added to the particulate cold polyol gel and the mixture heated to room temperature, whereupon it turns into a free-flowing powder, since cocoa particles prevent the gel beads from agglomerating. During the addition of the cocoa powder to the polyol gel, care should be taken to prevent moisture from the environment being drawn into the mixture. The amount of polyol gel in the mixture is preferably from 10 to 80% by weight, and especially from 40 to 70% by weight.

A second method of forming a particulated polyol gel comprises adding a cold polyol solution containing dispersed gelling agent to cocoa butter above its melting point, heating to dissolve the gelling agent, e.g., from 90° to 170° C., with agitation, e.g., stirring, to disperse the polyol droplets (containing gelling agent) throughout the cocoa butter phase to form an emulsion. The droplet size may be reduced by increased agitation, and for particle sizes below about 100 microns, a homogeniser may be used. If desired, an emulsifier such as lecithin may be added. After the required droplet size is obtained, the mixture may be allowed to cool, e.g., to room temperature, while continuing the agitation to maintain the droplets uniformly dispersed in the cocoa butter matrix. When the temperature falls below the gelling point, the droplets turn into gel beads. When the temperature falls below the melting point of the cocoa butter (30°–38° C.), the viscosity of the mixture increases, and finally, the mixture solidifies and prevents coalescence of the gel beads. If desired, an excess of cocoa butter may be separated from the gel beads while the mixture is still in the liquid phase, e.g., by decantation, centrifugation or filtration.

The polyol gel product may be added to the flowable chocolate or chocolate-type ingredients at any suitable stage, e.g., in the case of chocolate and certain chocolate-type products, before, during or after tempering as long as the polyol gel remains in solid particulate form during the mixing and during subsequent processing, which may include tempering and afterwards moulding into tablets or bars of the desired shape, or depositing a coating. The polyol gel is preferably in bead or powdered form.

The amount of polyol in the resultant product may be from 0.5 to 10%, preferably from 0.75 to 5% and most preferably from 1 to 2% by weight based on the total weight of the product.

The process of this invention may be used for preparation of low-cost chocolate or chocolate products (because high-cost fat can be replaced with water and/or glycerin), for low calorie chocolate or chocolate products (because of replacement of fat by water), and for the addition of water- or glycerin-soluble aromas and flavors into chocolate or chocolate products.

EXAMPLES

The following Examples further illustrate the present invention. Parts and percentages are given by weight.

Example 1

(a) 100 parts of dry glycerin were continuously agitated by a magnetic stirrer and 3 parts of kappa-carrageenan were added slowly at a temperature below the gelation temperature in order to avoid incipient gelation and lump formation. The temperature was raised to 120° C. while maintaining the stirring, during which time the carrageenan was first in dispersion and as the temperature increased, it entered into solution. The solution was then allowed to cool to ambient temperature, during which time gelation occurred between 80° and 50° C.

(b) The gel was then frozen in liquid nitrogen to −185° C. and ground to a particle size of 200 microns by a mortar and pestle in a cold grinder. 100 parts of cocoa powder were added and the temperature allowed to rise to room temperature while ensuring that moisture from the environment was not absorbed into the mixture. At room temperature, the mixture turned into a free-flowing powder in which the cocoa particles prevent the gel beads from agglomerating.

(c) The glycerin gel prepared above was then used to prepare heat-resistant chocolate by the following procedure:

100 parts of milk chocolate were melted in an oven at 40° C. 2 parts of the glycerin gel prepared above were mixed into the melted chocolate and thoroughly dispersed using a spatula to give a chocolate containing 1% by weight of glycerin.

Test Procedure

In order to determine the period of time before the chocolate sets, the following testing procedure was used:

Commercially available milk chocolate was melted at 40° C. The desired amount of glycerin gel was added to the molten chocolate and continuous stirring was applied by hand for about five minutes while the temperature of the chocolate was above its melting point. If during this time no considerable increase of viscosity was observed, it was assumed that there was sufficient retention of glycerin in the gel structure. Subsequently, the chocolate was allowed to set at room temperature and it was stored at ambient conditions. During the next several days, from time to time the chocolate sample was placed in an oven at 40° C. If the sample became soft, it was taken out of the oven and stored at room temperature for a longer period of time. On the other hand, if the sample did not soften, that was an indication that glycerin had been released from the gel matrix and hardened the chocolate. The time required for this is defined as "hardening time".

In this case, the chocolate containing the glycerin gel had not reached its hardening time even after 50 days.

Examples 2 to 5

A similar procedure to that described in step (a) of Example 1 for preparing a glycerin gel was followed, but adding to the glycerin, in addition to 3 parts of kappa-carrageenan, 3 parts of locust bean gum, 1 part of potassium caseinate and 0.2 parts of KCl. The gel was frozen and ground as in step (b) of Example 1, cocoa powder was added to the frozen gel in the ratios shown in Table 1, and the resultant glycerin gel was added to 100 parts of milk chocolate in the amounts shown in Table 1. The percentage amount of glycerin added to the chocolate and the time taken for the chocolate to harden are also indicated in Table 1.

TABLE I

| EXAMPLE | GEL/POWDER WEIGHT RATIO | AMOUNT ADDED | % GLYCERIN IN CHOCOLATE | HARDENING |
|---|---|---|---|---|
| 2 | 40:60 | 0.5 | 2 | SOFT AFTER 40 DAYS |
| 3 | 60:40 | 0.83 | 5 | 2 DAYS |
| 4 | 70:30 | 0.285 | 2 | SOFT AFTER 40 DAYS |
| 5 | 60:40 | 0.67 | 4 | 3 DAYS |

Comparative Example 2 parts of free glycerin were added to 100 parts of milk chocolate melted at 40° C. After stirring for only 30 seconds, the mix became very hard and further mixing was impossible.

Example 6

3 parts of kappa-carrageenan, 3 parts of locust bean gum, 1 part of potassium caseinate and 0.2 parts of KCl were added in 100 parts of dry glycerin and were dispersed at a temperature below the gelation temperature.

40 parts of the glycerin gel were added to 100 parts of liquid Malaysian cocoa butter and heated to 100° C. The glycerin droplets were dispersed into the butter phase by means of a homogeniser and afterwards, the mixture was cooled to give a butter phase containing gel beads having a mean diameter of 200 microns.

5 parts of the butter/glycerin gel, as prepared above, were mixed into 100 parts of milk chocolate melted in an oven at 40° C. and thoroughly dispersed using a spatula to give chocolate containing 2% by weight of glycerin. By following the test procedure described in Example 1, the chocolate containing the glycerin gel hardened after 40 days.

It is apparent from the results described in the foregoing Examples that the carrageenan gels can be used to control the release of glycerin into the chocolate mass. Therefore, it is possible to process chocolate that contains glycerin without the undesired increase in viscosity. Upon storage, glycerin will release, gradually, thus imparting heat-resistance to the resultant chocolate.

Examples 7–16

A similar procedure to that described in Example 6 for preparing a glycerin gel was followed but using, instead of kappa-carrageenan, the following gelling agents which are available commercially from FMC Corporation, Food Ingredients Division, 1735 Market St, Philadelphia, Pa. 19103, U.S.A.

GELCARIN DG654B (a mixture of kappa-carrageenan and locust bean gum)
GELCARIN DG556B (a mixture of iota-carrageenan and locust bean gum)
GELCARIN GP359 (kappa-carrageenan)
GELCARIN GP812 (kappa-carrageenan with potassium and sodium ions)

Experiments were performed in order to study the effects of the type of gelling agent, concentration of the gelling agent, gel bead size and the amount of gel added to the chocolate on the effective "hardening" time of chocolate samples. The results are shown in the following Table II where the measurements are only qualitative and should be considered only an approximation. The hardening times are also approximate since the samples were not monitored every day.

TABLE II

| Example | Gelling Agent | Conc. % Gelling Agent | Bead Size (μ) | Gel % Added To Chocolate | Hardening Time (Days) |
|---|---|---|---|---|---|
| 7 | GELCARIN DG654B | 2 | <100 | 3.3 | 8 |
| 8 | GELCARIN DG654B | 6 | <100 | 7.2 | 9 |
| 9 | GELCARIN DG654B | 6 | >300 | 7.6 | 29 |
| 10 | GELCARIN DG556B | 3 | <100 | 10.6 | 13 |
| 11 | GELCARIN DG556B | 6 | >300 | 6.1 | 21 |
| 12 | GELCARIN GP812 | 2 | <100 | 7.0 | 19 |
| 13 | GELCARIN GP812 | 4 | <100 | 6.8 | 16 |
| 14 | GELCARIN GP812 | 6 | <100 | 10.4 | 16 |
| 15 | GELCARIN GP812 | 6 | >300 | 6.7 | 29 |
| 16 | GELCARIN GP359 | 2 | <100 | 6.0 | 12 |

Effect of Type of Gelling Agent on Hardening Time

It can be seen that the shortest hardening times (8–12 days) are achieved by DG654B and by FP359, which are the kappa-carrageenan agents, and by the small gel beads. Medium hardening times (13 days) are achieved by DG556B, which is the iota-carrageenan agent. Longer hardening times (16–19 days) are required for GP812, which is kappa-carrageenan combined with potassium and sodium salts.

Effect of Gelling Agent Concentration and Amount of Gel Added to Chocolate on Hardening Time There is a slight tendency, if any, for the hardening time to increase with increasing concentration of the gelling agent, as is suggested from Examples 7 to 11. More profound is the effect that the amount of gel added to the chocolate has on the hardening time.

By comparing Examples 14 and 15 where the concentrations of the gelling agent are the same (6%), the hardening time was increased from 16 to 29 days when the amount of glycerin gel added to the chocolate was reduced from 10.4% to 6.7%.

Effect of Gel Bead Size on Hardening Time

It is apparent that for each gelling agent used, the hardening time is longer when the gel bead size is larger. So, for DG654B, the hardening time is 8 days for the small gel beads and 29 days for the large. For DG556B, the hardening time is 13 days for the small gel beads and 21 for the large beads. Finally, for GP812, the hardening time is 16–19 days for the small gel beads and 29 days for the larger gel beads.

Examples 17–23

A similar procedure to that described in Example 6 for preparing a glycerin gel was followed but using, instead of kappa-carrageenan, GELCARIN DG654B at a concentration of 6% based on the gel and, instead of dry glycerin, a mixture of glycerin and water as indicated in Table III below:

TABLE III

| Example | Water-to-Glycerol Ratio | Bead Size (μ) | % Gel Added To Chocolate | Hardening Time (Days) |
|---|---|---|---|---|
| 17 | 50/50 | >300 | 9.6 | 7 |
| 18 | 60/40 | >300 | 6.4 | 5 |
| 19 | 70/30 | >300 | 8.1 | 5 |
| 20 | 80/20 | >300 | 2.5 | 5 |
| 21 | 40/60 | <100 | 6.7 | 3 |
| 22 | 50/50 | <100 | 5.6 | 3 |
| 23 | 60/40 | <100 | 4.3 | 3 |

Experiments were performed in order to study the effects of the gel bead size, and water content of the gel on the effective "hardening" time of chocolate samples. The measurements are only qualitative and should be considered only an approximation. The hardening times are also approximate since the samples were not monitored every day.

Table III shows that the addition of water/glycerol gels results in much shorter hardening times of chocolate (compare to Table II that lists the hardening times for various glycerol gels). This is possibly due to the small size of the water molecules, which permits them to exude from the gel structure. It is also apparent from Table II that the smaller the gel bead size, the shorter the hardening time.

We claim:

1. A process for improving the heat resistance of chocolate and chocolate-type products comprising mixing an amount of a polyol gel in particulate form with a flowable chocolate or with a flowable mixture of ingredients for preparing a chocolate or chocolate-type composition to obtain a product containing the particulate polyol gel which has, based upon the product weight, a polyol content of from 0.2% to 60% by weight.

2. A process according to claim 1 wherein the particulate gel is mixed with the flowable chocolate or mixture in an amount so that the product has a polyol content of from 0.2% to 10% by weight.

3. A product of the process of claim 2.

4. A process according to claim 2 wherein the polyol content is from 0.75% to 5% by weight.

5. A process according to claim 2 wherein the polyol content is from 1% to 2% by weight.

6. A process according to claim 1 or 2 further comprising tempering the product.

7. A process according to claim 1 further comprising mixing a polyol with an agent for gelling the polyol selected from the group consisting of ionic and thermal polyol gelling agents, forming a gel and then forming the gel into particles to obtain the particulate gel.

8. A process according to claim 7 wherein the gelling agent is a thermal gelling agent and further comprising heating the polyol and gelling agent to a temperature above the gelling agent dissolution temperature and then cooling to form the gel.

9. A process according to claim 7 wherein, based upon the polyol weight, the gelling agent is mixed with the polyol in an amount of from 0.5% to 15% by weight.

10. A process according to claim 7 or 8 further comprising mixing at least one substance selected from the group consisting of alkali metal salts, alkaline earth metal salts, casein and cocoa powder with the polyol and gelling agent.

11. A process according to claim 10 wherein, based upon the polyol weight, the gelling agent is mixed in an amount of from 0.5% to 1.5% by weight.

12. A process according to claim 7 further comprising mixing a gum with the polyol and gelling agent.

13. A process according to claim 12 wherein, based upon the polyol weight, the gum is mixed with the polyol and gelling agent in an amount of up to 10% by weight.

14. A process according to claim 13 wherein the gum is mixed with the polyol and gelling agent in an amount of from 0.5% to 5% by weight.

15. A process according to claim 12 or 13 wherein, based upon the polyol weight, the gelling agent is mixed with the gum and polyol in an amount of from 0.5% to 15% by weight.

16. A process according to claim 15 wherein the gelling agent is mixed in an amount of from 1% to 7% by weight and the gum is mixed in an amount of from 0.5% to 5% by weight.

17. A process according to claim 1 or 2 wherein, based upon the polyol weight, the gel contains water in an amount of from 5% to 85% by weight.

18. A process according to claim 1 or 2 wherein the particulate polyol gel has a mean particulate diameter of from 5 microns to 400 microns.

19. A process according to claim 1 or 2 further comprising preparing a polyol gel, freezing the gel to obtain a frozen gel, grinding the frozen gel to obtain a frozen particulate polyol gel, mixing an anticaking agent with the frozen particulate gel for obtaining a free-flowing polyol gel product upon warming to a room temperature and then mixing the free-flowing gel product with the flowable chocolate or mixture.

20. A process according to claim 19 wherein the anticaking agent is cocoa powder.

21. A process according to claim 19 wherein the gel is frozen at a temperature of from −170° C. to −200° C.

22. A process according to claim 1 or 2 further comprising adding a dispersion of a polyol and a gelling agent to melted cocoa butter, heating and agitating the dispersion and melted cocoa butter to dissolve the gelling agent and to disperse the polyol and gelling agent to form polyol/gelling agent droplets and to form an emulsion and then agitating and cooling the emulsion to a temperature below a gelling point temperature for obtaining a particulate polyol gel suspended in a cocoa butter phase, separating the particulate gel from the butter phase and then mixing the particulate gel with the flowable chocolate or mixture.

23. A product of the process of claim 1.

24. A chocolate composition containing a particulate polyol gel incorporated therein.

25. A composition according to claims 24 wherein the composition has a polyol content of from 0.2% to 10% by weight.

26. A composition according to claim 24 wherein the composition comprises chocolate selected from the group consisting of milk chocolate and white chocolate.

27. A composition according to claim 24 wherein the particulate polyol gel comprises a polyol and comprises a gelling agent selected from the group consisting of kappa-carrageenan and locust bean gum.

* * * * *